2,800,987
Patented July 30, 1957

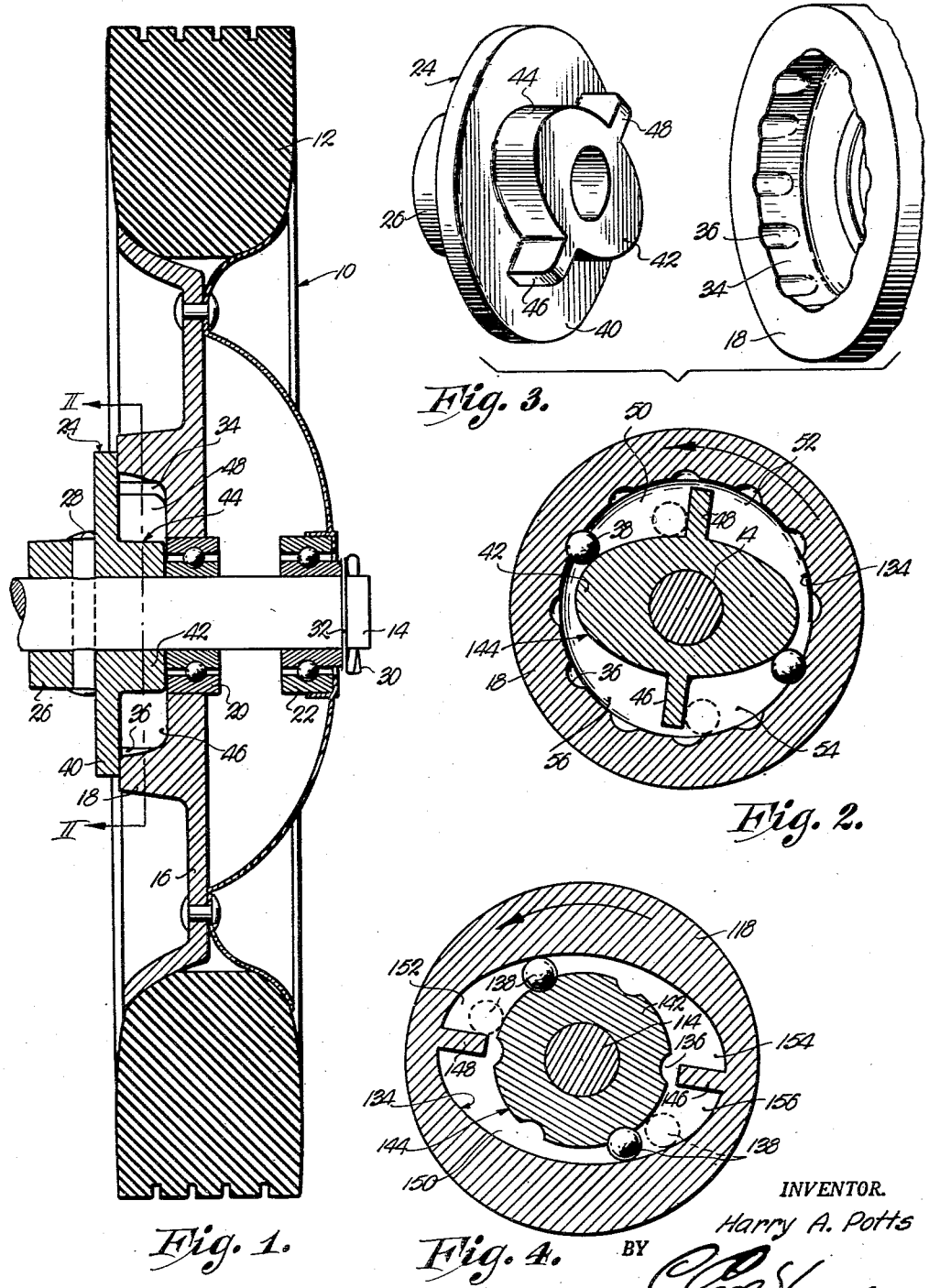

2,800,987
RATCHET WHEEL HAVING REVERSIBLE PARTS

Harry A. Potts, Iola, Kans., assignor to The Durite Corporation, Iola, Kans., a corporation of Kansas Application June 29, 1953, Serial No. 364,705

1 Claim. (Cl. 192—45)

This invention relates to improvements in wheel and axle assemblies, the primary object being to provide a novel ratcheting means for permitting free rotation of the wheel on the axle in one direction and for automatically interconnecting the wheel and the axle when the wheel is rotated in the opposite direction to the end that the wheel drives the axle.

It is an important object of this invention to provide ratcheting means for interconnecting wheels with an axle upon which the same are mounted, which ratchet is positive in its action, long-lasting, simple and inexpensive to manufacture, and interchangeable so that the axle may be caused to rotate in either direction simply by an easy reassembling of the parts.

It is an essential aim of the present invention to provide ratcheting means for wheels and axles that includes a plurality of chambers for receiving roller elements that are free-floating in the chambers when the wheel rotates in one direction and which bind so as to cause rotation of the axle when the wheel is rotated in the opposite direction, the direction of rotation of the axle being governed entirely by the disposition of the rollers in the chambers and which disposition may be changed quickly and easily by even the unskilled workman.

Another important object of this invention is to provide a wheel and axle, both of which are provided with driving surfaces between which the roller elements bind when the wheel is rotated in one direction, the surfaces being so formed as to present chambers for the roller elements and to clear the latter when the wheel is rotated counter to the intended direction of rotation of the axle.

Other objects include the way in which one of the aforementioned driving surfaces is elliptically-shaped and spaced radially from the other driving surface; the manner of providing a peripheral series of roller-receiving cavities in the circular driving surface; the way in which the elliptical, cam-shaped driving surface is provided with a number of radial lugs operating as abutments for the roller elements when the wheel is rotated in a direction to ride freely on the axle; the manner of disposing the cavities so that a balanced, diametrically opposed binding action takes place between the two driving surfaces; and many additional objects including important details of construction, all of which will become clear as the following specification progresses.

In the drawing:

Fig. 1 is a vertical, substantially central, cross-sectional view through a ratchet wheel having reversible parts made according to my present invention.

Fig. 2 is a cross-sectional view taken on line II—II of Fig. 1.

Fig. 3 is a stretched-out perspective view showing the driving surfaces of the collar and the hub; and Fig. 4 is a cross-sectional view similar to Fig. 2 showing a modified form of the invention.

A wheel and axle assembly broadly designated by the numeral 10 in Fig. 1 of the drawing includes a wheel 12 and an axle 14 upon which the wheel 12 is mounted.

A disc 16 forming a part of the wheel 12 is provided with a hub 18 that is concentric with the axle 14, which it circumscribes. The wheel 12 is supported on the axle 14 through the medium of a pair of spaced-bearings 20 and 22, the former being mounted within the hub portion 18 of disc 16.

A collar broadly designated by the numeral 24 has a sleeve 26 surrounding the axle 14 and secured thereto by means of a cross-pin 28. A removable key 30 passing through the axle 14 and bearing against a washer 32 cooperates with the sleeve 26 and pin 28 in holding the wheel 12 against longitudinal movement along the axle 14.

The cup-shaped hub 18, within which the bearing 20 is mounted, has a circular-driving surface 34 which faces inwardly toward the axle 14 and which is provided with a peripheral series of substantially semi-circular cavities 36 adapted to receive spherical roller elements 38 in seated relationship thereto.

The collar 24 is provided with a circular plate 40 integral with the sleeve 26 thereof and which closes the hollow hub 18 in sliding engagement therewith when the wheel 12 rotates in a direction opposite to the arrow of Fig. 2. The collar 24 is additionally provided with a boss 42 integral with the plate 40 in opposed relationship to the sleeve 26 and disposed within the hollow hub 18. The boss 42 has an elliptical cam-shaped driving surface 44 and it is seen in Figs. 1 and 2 of the drawing that the circular driving surface 34 of the hub 18 surrounds the elliptical surface 44 of the boss 42.

Manifestly, the boss 42, by virtue of its elliptical shape, is provided with a major and minor axis, and a pair of opposed, diametrically-spaced lugs 46 and 48, integral with the boss 42 and with the innermost face of plate 40, are disposed in alignment with the minor axis of the boss 42. The lugs 46 and 48 are spaced at their outermost ends from the circular driving surface 34 and present abutments for the rollers 38 when the wheel 12 is rotated in a direction counter to the direction of the arrow in Fig. 2 of the drawing. The driving surfaces 34 and 44 are radially-spaced and, by virture of the disposition of the lugs 46 and 48, there is presented a plurality of chambers 50, 52, 54 and 56 within the hollow hub 18, each adapted to receive one of the rollers 38. By virtue of the configuration of the driving surface 44, as compared with the circular-driving surface 34, the chambers 50, 52, 54 and 56 each progressively increase in radial width as the corresponding lug 46 or 48 is approached. The diameter of the rollers 38 is appreciably less than such radial widths of the chambers 50, 52, 54 and 56 adjacent the lugs 46 and 48, but rollers 38 have a sufficiently large diameter to wedge or bind between the surfaces 34 and 44 when the rollers 38 are spaced from the lugs 46 and 48 and even when the rollers 38 are seated within one of the cavities 36.

While but one roller 38 is needed for causing rotation of the axle 14 when the wheel is rotated in the direction of the arrow of Fig. 2 of the drawing, it is preferred in practice to use a pair of rollers 38 disposed in diametrically opposed chambers. In Fig. 2 of the drawing a roller 38 is shown within each of diametrically opposed chambers 50 and 54.

Accordingly, when the wheel 12 is rotated in the direction of the arrow of Fig. 2, the two rollers 38 will automatically seat within one of the cavities 36 and bind against the elliptical cam surface 44, thereby interconnecting the wheel 12 and the axle 14 for rotation together in the direction of the arrow of Fig. 2. Conversely, when the wheel 12 is rotated in a direction opposite to the arrow of Fig. 2 of the drawing, the rollers 38 will move out of the cavities 36 and into abutting relationship to the lugs 46 and 48, all to the end that the wheel 12 rotates freely relative to the axle 14 and the rollers 38 float freely within their respective chambers 50 and 54.

In the event that it is desired to have wheel 12 rotate freely with respect to the axle 14 in the direction of the arrow of Fig. 2, it is but necessary to remove the key 30 and thereupon remove the wheel 12 from the axle 14, whereupon the rollers 38 are positioned in the chambers 52 and 56 rather than in the chambers 50 and 54. This is particularly advantageous in that it eliminates a "right" and "left" ratchet for the two wheels of the axle. Accordingly, each of the two wheels and particularly the hubs 18 and the collars 24 thereof may be identical in manufacture.

The construction hereinabove set forth has been employed with particularly satisfactory results in the field of lawn mowers. Power-driven lawn mowers conventionally employ the same prime mover, which rotates the grass cutting knife, for motivating the mower forwardly. Such prime mover is operably coupled with the axle such as shown at 14 in the drawing, and as the axle 14 is rotated continuously in one direction, the two ground engaging wheels are driven simultaneously from the axle. As the operator of the lawn mower manipulates turns, one of the wheels is driven by the axle while the other wheel remains stationary or is driven at a slower speed, while the axle rotates freely with respect thereto.

It is additionally quite common for users to order new wheels from the manufacturer without specifying whether the left or the right wheel is desired, and by virtue of the identical nature of the two wheels hereof, it is not necessary for the manufacturer to further inquire from the user which of the wheels is desired.

In the modification of my invention, shown in Fig. 4 of the drawing, the driving surface 134 of the hub 118 is elliptical and surrounds the circular-driving surface 144 of the boss 142 forming a part of the collar, which surrounds the axle 114 and is affixed thereto. Surfaces 134 and 144 are radially spaced and lugs 146 and 148 are diametrically opposed to present a plurality of chambers 150, 152, 154 and 156, each adapted to receive a roller element 138. Lugs 146 and 148, which terminate in spaced-relationship to the driving surface 144, are integral with the hub 118 and are disposed in alignment with the major axis of the elliptically-shaped driving-surface 134. The circular-driving surface 144 on the boss 142 is provided with a peripheral series of cavities 136 that are substantially semi-circular in cross-section for receiving rollers 138 in seating relationship thereto.

In all respects the operations of the form shown in Fig. 4 of the drawing is the same as the modification of Figs. 1 to 3 inclusive and the advantages emanating from its use are equally as important.

Having thus described the invention, what is claimed as new and desired to be secured by Letters Patent is:

In ratcheting mechanism, a pair of rotatable members, one of said members including a dish-shaped hub having a bottom, an outermost, annular face and an innermost, annular surface, the other member including a circular plate closing said one member in overlying relationship to said face, said plate having a boss housed within the one member and integral with one face of the plate; shaft means extending through the members and concentric with the plate and said surface, said boss having an elliptical cam surface surrounding the shaft, said shaft traversing the boss centrally of said cam surface, the end of the boss at the major axis thereof being spaced from said annular surface, and said boss spanning the distance between said bottom and said plate; a pair of diametrically opposed lugs integral with the boss and plate and extending radially outwardly from the cam surface in alignment with the minor axis of the latter terminating in spaced relationship to said annular surface, presenting a plurality of chambers within the one member; and a ball within each of a pair of said chambers, said pair of chambers being diagonally opposed, there being a plurality of equally spaced, transverse cavities in said annular surface throughout the circumference thereof, the distance between said ends of the boss and the bottoms of the cavities being less than the diameter of the balls adapting each ball to rest in a cavity and bind between the bottom of the latter and the cam surface when one of the members is rotated in one direction.

References Cited in the file of this patent

UNITED STATES PATENTS

| 76,328 | Johnson et al. | Apr. 7, 1868 |
| 951,485 | Moseson | Mar. 8, 1910 |
| 993,563 | Stanley | May 30, 1911 |
| 1,057,495 | Packer | Apr. 1, 1913 |
| 1,375,576 | Duca | Apr. 19, 1921 |
| 1,716,750 | Anderson | June 11, 1929 |
| 2,051,385 | Murray | Aug. 18, 1936 |

OTHER REFERENCES

| 683,855 | France | June 18, 1930 |